United States Patent
Cramer

(10) Patent No.: US 9,234,773 B2
(45) Date of Patent: Jan. 12, 2016

(54) SELF-COMPENSATING ANGULAR ENCODER

(75) Inventor: Peter G. Cramer, West Chester, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 303 days.

(21) Appl. No.: 13/108,277

(22) Filed: May 16, 2011

(65) Prior Publication Data

US 2011/0282612 A1 Nov. 17, 2011

Related U.S. Application Data

(60) Provisional application No. 61/345,198, filed on May 17, 2010.

(51) Int. Cl.
*G01D 5/347* (2006.01)
*G01D 5/244* (2006.01)

(52) U.S. Cl.
CPC .......... *G01D 5/3473* (2013.01); *G01D 5/24452* (2013.01); *G01D 5/24485* (2013.01); *G01D 5/34738* (2013.01)

(58) Field of Classification Search
CPC .. G01B 9/0207; G01B 11/245; G01D 5/3473; G01D 5/24452; G01D 5/34738; G01D 5/24485
USPC ............... 702/92, 94, 140, 154, 166; 73/1.75, 73/861.18, 862.69, 862.381
See application file for complete search history.

(56) References Cited

U.S. PATENT DOCUMENTS

| 5,640,377 A | 6/1997 | Watanabe et al. |
| 6,138,367 A | 10/2000 | Raby |
| 7,019,281 B2 * | 3/2006 | Igaki ................. G01D 5/34738 250/231.13 |

(Continued)

FOREIGN PATENT DOCUMENTS

JP 11118520 A 4/1999

OTHER PUBLICATIONS

R Probst, "Self-calibration of divided circles on the basis of a prime factor algorithm", Meas. Sci. Technol. 19 (2008) 015101.*

(Continued)

*Primary Examiner* — Alexander Satanovsky
*Assistant Examiner* — Ivan Rabovianski
(74) *Attorney, Agent, or Firm* — Cantor Colburn LLP

(57) ABSTRACT

A method for self-compensating a method includes the steps of rotating the patterned element relative to the read heads, the rotation about the axis to a plurality of first angles covering a range of at least 360 degrees; obtaining, at each of the plurality of first angles, first angular readings for the m measure read heads and for the reference read head; calculating a first array for each of the m measure read heads, each first array including, for each of the plurality of first angles, a difference in the first angular readings of the measure read head and the first angular reading of the reference read head; calculating, for each of the m measure read heads, at least one first spectral component based at least in part on the first array; calculating, for each of the m measure read heads, at least one second spectral component, the second spectral component based, at least in part, on the at least one first spectral component and on estimates of the second angles of the m measure read heads; and recording, for each of the m measure read heads, the at least one second spectral component.

4 Claims, 16 Drawing Sheets

(56) References Cited

U.S. PATENT DOCUMENTS

| | | | |
|---|---|---|---|
| 7,060,969 | B2 | 6/2006 | Uchiyama et al. |
| 7,546,689 | B2 | 6/2009 | Ferrari et al. |
| 7,589,313 | B2 | 9/2009 | Nordenfelt et al. |
| 7,825,367 | B2 | 11/2010 | Nakamura et al. |
| 2006/0043964 | A1 | 3/2006 | Watanabe et al. |
| 2010/0039656 | A1 | 2/2010 | Lippuner et al. |

OTHER PUBLICATIONS

Tsukasa.Watanabe et al., "Self-Calibratable Rotary Encoder", Journal of Physics: Conference Series 13 (2005) 240-245.*

International Preliminary Report on Patentability for International Application Serial No. PCT/US2011/036624. International filing date May 16, 2011. Date of Issuance Nov. 20, 2012.

International Search Report for International Patent Application PCT/US2011/036624; Date of Mailing Sep. 16, 2011.

Written Opinion of the International Seraching Authority for International Patent Application PCT/US2011/03664; Date of Mailing Sep. 16, 2011.

CN Office Action for Application No. 201180024866.0 dated Oct. 10, 2014, 8 pages.

\* cited by examiner

SELF-COMPENSATING ANGULAR ENCODER

BACKGROUND

The present disclosure relates generally to an angle measuring device and specifically to a device known as an angular encoder (or rotary encoder).

The angular encoder may be constructed in different ways. One type of angular encoder comprises a glass disk, one or more read heads, and processing electronics. The one or more read heads send light to the disk. This light is either transmitted through or reflected off the disk to optical detectors, which are also a part of the read heads. The glass disk contains a pattern, which may be as simple as a collection of lines directed radially outward from the disk center. As the disk rotates, the pattern of light changes on the read head. This changing light pattern is evaluated by the processing electronics to find the angle of rotation of the glass disk relative to the read heads. In most cases, the glass disk is attached to the rotating member, which might be an axle, and the read heads are attached to the frame within which the axle rotates.

A second type of angular encoder places the pattern on a ring rather than a disk. The one or more read heads send light to the ring, where it strikes the pattern reflecting back to the detectors in the read head. The changing pattern of light on the detector is evaluated by the processing electronics to find the angle of rotation of the ring relative to the read heads. In most cases, the ring is attached to the rotating member, which might be an axle, and the read heads are attached to the frame within which the axle rotates.

The disk and rings described above may be generally classified as patterned elements in that each holds a pattern, which may be a pattern of marks, for example, that are read by read heads, as described below. The patterned elements are designed to cooperate with read heads, described below, and the cooperation may involve optical, magnetic, mechanical, or other types of interaction between the patterned element and the read heads.

The read head is a device that reads a signal reflected by or transmitted through an encoder disk, ring, or similar structure. The most common types of read heads generate and respond to optical signals. A read head is constructed in such a way as to be able to distinguish between two directions of rotation of the disk or ring (for example, forward and backward). The most common method of providing the sense of direction is to obtain quadrature electrical signals, which are signals separated in phase by ninety degrees, from the obtained signal. Quadrature signals are also useful because they improve the accuracy of the encoder readings. There may be several read heads for each encoder disk or ring, and each of these read heads may produce quadrature electrical signals.

An angular encoder may be absolute or incremental. An absolute encoder provides the information to determine the present angle in an absolute sense—that is, without having a history of previous angle measurements. An incremental encoder, on the other hand, requires knowledge of previous encoder readings to determine the present reading. Ordinarily an incremental encoder contains a structure on the disk or ring that produces an optical signal that is transformed by the read head into an index pulse. The index pulse serves to provide a reference position, ordinarily accurate to within one line on the encoder disk or ring. At the start of a measurement session, an instrument containing an incremental encoder may begin by carrying out a procedure to determine the location of the index pulse. Generally the read head determines the position of the index pulse to a fraction of the spacing between two lines on the encoder disk or ring. Thereafter, a read head may count the number of lines that have passed it in either the forward and backward directions. From knowledge of the angle between encoder disk lines, it determines the present angle.

The accuracy with which angular encoders can measure varies widely. For inexpensive encoders, the angles may be measured in fractions of a degree. In contrast, other encoders are accurate to a fraction of an arc second. Highly accurate encoders are important to the class of devices that includes laser trackers, total stations, laser scanners, and theodolites. Accuracies required for such devices are often on the order of one microradian, or 0.2 arc seconds.

In most cases, the largest errors associated with angular encoders repeat for every 360 degree rotation of the encoder disk or ring. Additional errors, ordinarily smaller, may be associated with rotation of the bearings upon which the encoder disk or ring rotates. Such bearing errors typically repeat every 720 degrees, as is known in the art.

In this document, the dominant errors affecting the angular encoders are assumed to have a period of 360 degrees, although the method described herein can be easily extended without a reformulation of the mathematics to apply to the encoder-bearing system having a periodicity of 720 degrees or any multiple of 360 degrees. For the remainder of this document, it will be assumed that the errors have a period of 360 degrees so that they may be decomposed into spectral (Fourier) components having periods equal to $360°/n$, where $n=1, 2, 3, \ldots$ In the case of an angular encoder using a glass disk and a single read head, the largest error is usually the first order ($n=1$) error that occurs once every 360 degrees. The main cause of this error is miscentering of the laser disk. An effective way to remove this first-order error is to use two read heads spaced 180 degrees apart rather than a single read head. By averaging the readings of the two read heads, the first-order angular error is eliminated. In fact, averaging the readings of two read heads eliminates errors of order $1, 3, 5, \ldots$ (all orders except for those that are multiples of two).

For the case of an encoder that contains a glass disk, second order errors may be caused by tilt of the encoder disk relative to the read heads or by ellipticity (non-circularity) of the pattern of marks on the disk. These errors can be removed by using three or more symmetrically placed read heads. The readings from each of the read heads are averaged to find the encoder angle. In general, some number m of read heads can remove all Fourier error modes except for m and its harmonics. So two read heads cannot remove errors of orders $n=2, 4, 6, \ldots$. Three read heads cannot remove errors of orders $n=3, 6, 9, \ldots$.

To get the highest accuracy from reasonably priced encoders, some manufacturers who incorporate encoders in their products carry out a procedure called compensation (sometimes referred to as "calibration") in which parameters or maps are found that enable correction of errors in software or firmware. The most common type of compensation involves placing a highly accurate reference encoder on one end of the axle. Readings are taken at the same time for the reference encoder and the encoder under test. The difference in the recorded values of these two encoders is used to create a map or a function to correct encoder errors.

However, mapping has limitations. First, there are inevitably errors in coupling two encoder systems together and even a very accurate reference encoder will lose accuracy when temporarily coupled to an external axle. Second, as explained above, static mapping parameters cannot correct for changes caused by temperature shifts or mechanical shocks. Third, because mapping is not model based, there is no mechanism for removing any errors that arise in the mapping process itself. In addition, mapping is a time-consuming procedure that adds cost to the manufacturer's product and reduces profit.

Another potential problem faced by encoder users is degradation in encoder performance, either as a result of changing environmental conditions or as a result of damage to the encoder assembly itself. It would be highly advantageous to be able to (1) detect degradation in encoder performance and (2) correct degradation in encoder performance without returning the instrument to the factory for re-compensation.

A method for self compensation of angular encoders is described in U.S. Pat. No. 7,825,367 ('367) to Nakamura et al. The method involves using a linear array, such as a CCD sensor, to read the lines on an encoder disk at two locations. The disk is rotated through a number of angular steps over 360 degrees. By analyzing the difference in the readings at the two encoder positions, errors in the encoder assembly may be determined. However, a serious deficiency with this method is encountered in devices that must work in industrial environments that may have wide temperature swings. Large temperature variations (for example, from −15 to +50 degrees Celsius) may cause large errors in an angular encoder containing a single read head or, as in the '367 patent, a single linear array. Such variations occur, for example, as a result of the differential thermal expansion of materials such as epoxy applied non-uniformly in bonding the encoder disk to the mechanical shaft on which it rotates. Such large errors may be automatically removed by placing two read heads 180 degrees apart and then averaging the readings of the read heads. The method of patent '367 is unable to provide the very important automatic correction of encoder errors with changes in temperature. Further discussion of the effect of temperature is given hereinafter with respect to FIGS. 16, 17.

There is a need for an encoder apparatus and a compensation procedure that (1) enables higher accuracy than previously possible, (2) provides this high accuracy without mapping with an external reference encoder, (3) detects degradation in encoder performance during field use, (4) improves encoder performance in the field by carrying out a self-compensation procedure, and (5) provides automatic correction of low order encoder errors over temperature. In addition, in some cases, it may also be desirable to make use of data obtained from mapping to an external reference encoder if this mapping data is processed in a special way to improve encoder accuracy even further.

SUMMARY

According to one aspect of the present invention, a method for self-compensating an angular encoder system, the angular encoder system including a structure, a patterned element configured to rotate by a first angle relative to the structure, the rotation performed about an axis, and read heads including one reference read head and a number m of measure read heads, the number m being greater than or equal to two, the read heads fixedly disposed on the structure and substantially located on a plane and positioned about a central point at the intersection of the axis and the plane, each read head disposed on the structure at a second angle about the central point; the measure read heads arranged in such a way that separation between the second angles of adjacent measure read heads is substantially equal to 360 degrees divided by the number m, the reference read head arranged in such a way that separation between the second angle of the reference read head and the second angle of any of the m measure read heads is not equal to zero. The method includes the steps of rotating the patterned element relative to the read heads, the rotation about the axis to a plurality of first angles covering a range of at least 360 degrees; obtaining, at each of the plurality of first angles, first angular readings for the m measure read heads and for the reference read head; calculating a first array for each of the m measure read heads, each first array including, for each of the plurality of first angles, a difference in the first angular readings of the measure read head and the first angular reading of the reference read head; calculating, for each of the m measure read heads, at least one first spectral component based at least in part on the first array; calculating, for each of the m measure read heads, at least one second spectral component, the second spectral component based, at least in part, on the at least one first spectral component and on estimates of the second angles of the m measure read heads; and recording, for each of the m measure read heads, the at least one second spectral component.

BRIEF DESCRIPTION OF THE DRAWINGS

Referring now to the drawings, wherein like elements are numbered alike in the several FIGURES.

DETAILED DESCRIPTION OF THE PREFERRED EMBODIMENTS

Figure 1:
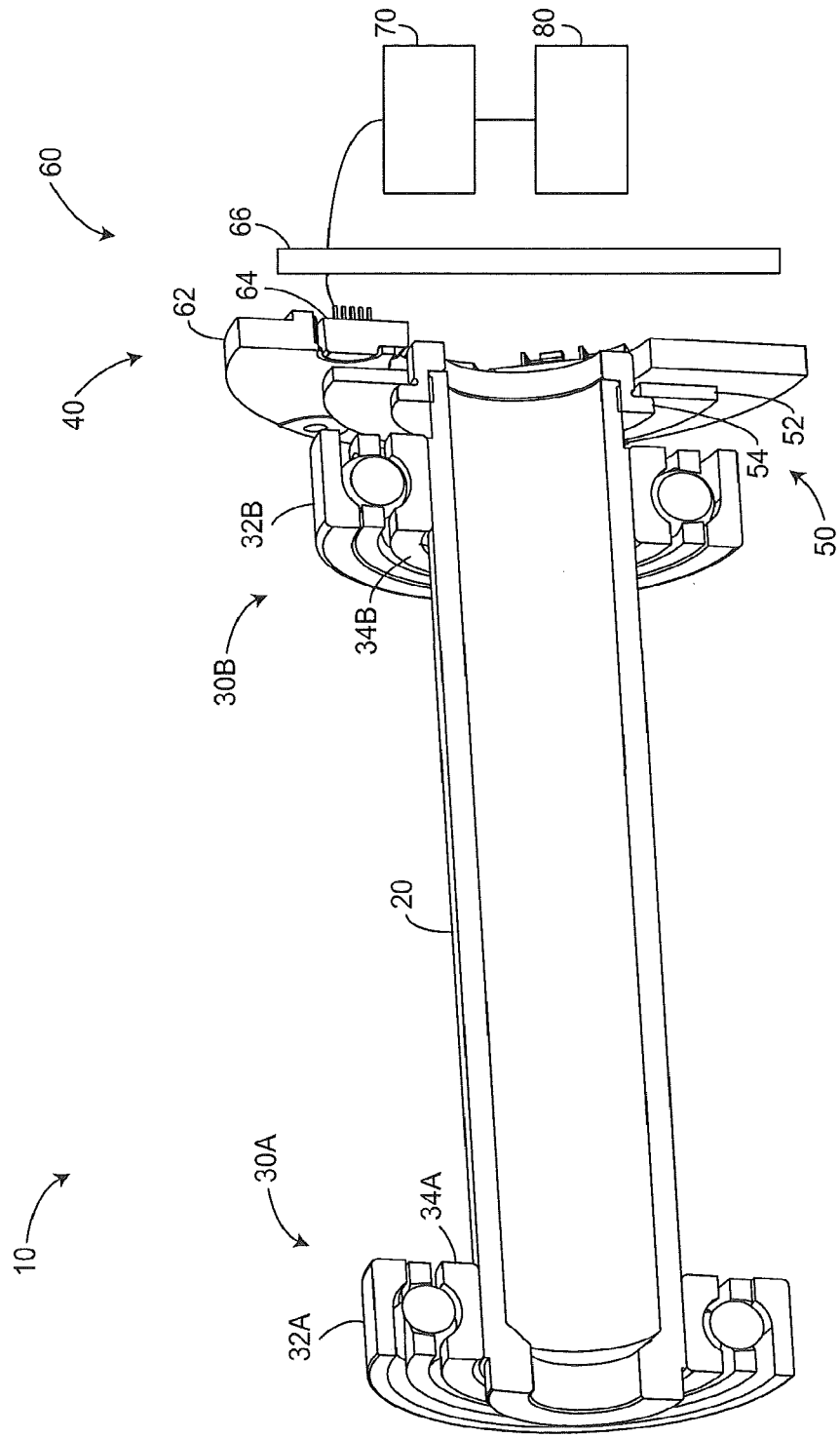
FIG. 1 shows a cross-sectional perspective view of an axle to which two bearings and an encoder disk are attached, where the disk sits adjacent to a read head assembly.

FIG. 1 shows a cross-sectional perspective view of exemplary axle assembly 10 comprising axle 20, left bearing 30A, right bearing 30B, encoder assembly 40, communication system 70, and optional one or more additional processor 80. Left and right bearings 30A, 30B are shown as ball bearings but other types of bearings such as roller bearings, needle bearings, or air bearings could be used. Outer races 32A, 32B are attached to the external structure (not shown) and inner races 34A, 34B are attached to axle 20. In this way, axle 20 can rotate with low friction within the external structure.

Encoder assembly 40 comprises encoder disk assembly 50 and read head assembly 60. Encoder disk assembly comprises encoder disk 52 and flange 54. Encoder disk 52 is rigidly attached through flange 54 to axle 20. Read head assembly 60 comprises mounting plate 62, read heads 64, and circuit board with processing electronics 66. Read heads 64 are securely attached to mounting plate 62 on their front side and are soldered to circuit board 66 on their back side. Read heads 64 send a laser beam to encoder disk. The laser beam bounces back and strikes optical detectors within read heads 64.

Electrical signals are transmitted through communication system 70 to one or more additional processors 80. Communication system 70 may be a device bus that transmits packets of information, for example. Optional one or more additional processor 80 alters the electrical signals from processing electronics to obtain the angle of rotation of axle 20. An example of additional processing that may be required by one or more additional processor 80 is adding or subtracting a constant to place the measured angle within the reference frame of the axle.

In a general sense, one or more read heads are attached to a structure. In the example shown in FIG. 1, the structure is the mounting plate 62. A patterned element, in this case, the encoder disk 52, is configured to rotate by a first angle relative to the structure. In the example shown in FIG. 1, the rotation is achieved by means of the axle 20 and the bearings 30A, 30B.

FIG. 2 and FIGS. 3A-3C show exemplary angular encoder 100 comprising encoder disk 110, measure read heads 120A, 120B, 120C, and reference read head 130. Encoder disk contains a pattern of lines that reflect light emitted from the read heads back to detectors within the read heads. The number of read heads may be more or less than the four read heads shown here, and the angles between the read heads may be different than those shown here. Preferably, however, the measure read heads are placed symmetrically within 360 degrees. For example, three read heads 120A, 120B, 120C are placed 120 degrees apart. The reference read head 130 is placed between two of the other read heads. A variety of angles is possible but some angles will work better than others, for reasons explained below. An angle of 55 degrees between reference read head 130 and one of the other read heads is a good choice.

Figure 4:
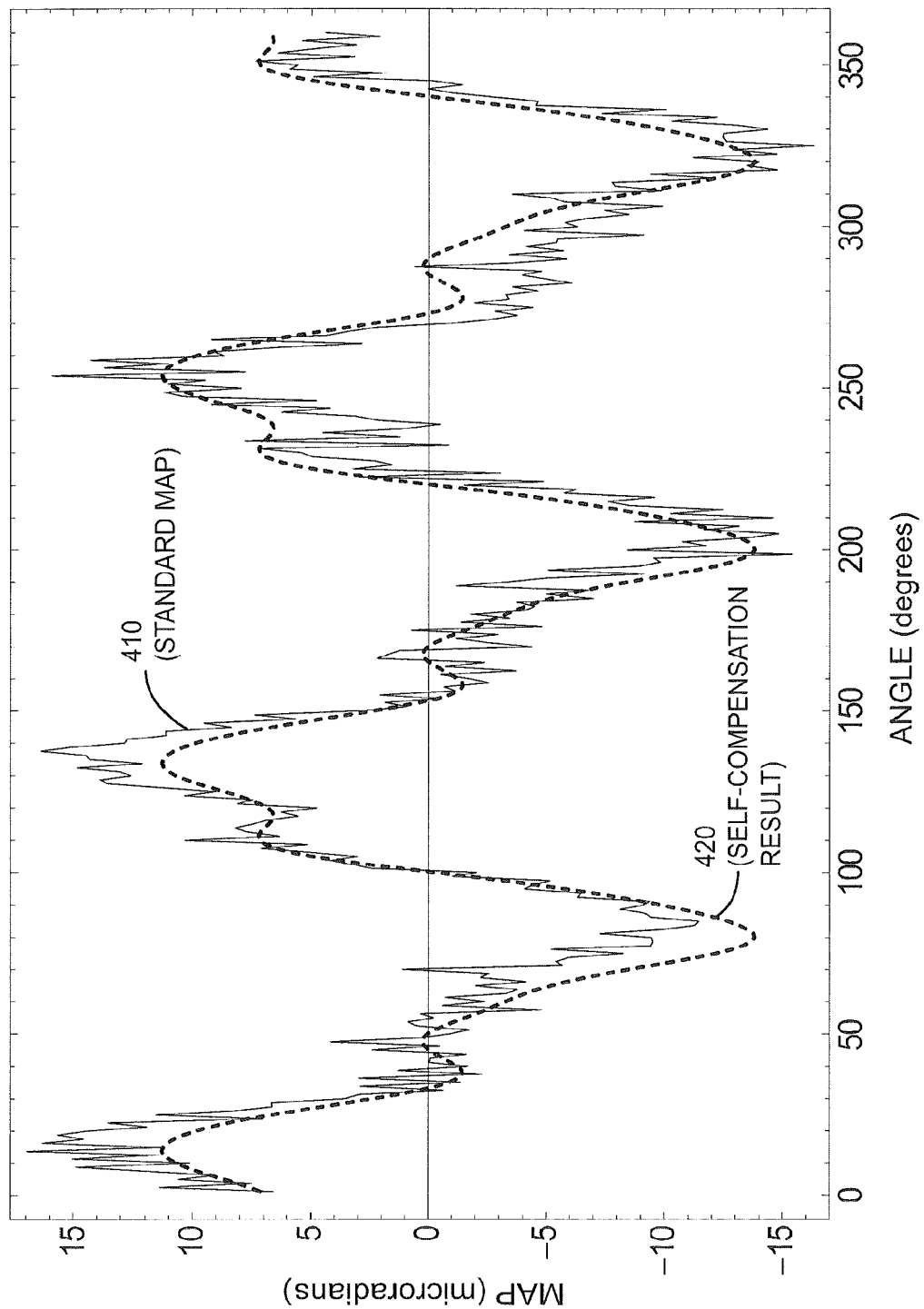
FIG. 4 shows a first exemplary map obtained using a standard mapping procedure and a second exemplary result obtained using a self-compensation procedure.

As explained in the introduction, some manufacturers map angular encoders internal to their instruments by attaching a reference encoder to one end of the axle to which their encoder is attached. The readings of the internal and reference encoders are then compared. A map, generated from the difference in readings, is used to correct the readings of the instrument's encoder. An example of such a map for an encoder with three read heads 120A, 120B, and 120C spaced 120 degrees apart is shown in FIG. 4. This map is marked 410 (STANDARD MAP) in the figure. An improved result using self-compensation methods described below is marked 420 (SELF-COMPENSATION RESULT). The method for obtaining this improved result is described hereinbelow.

Figure 5:
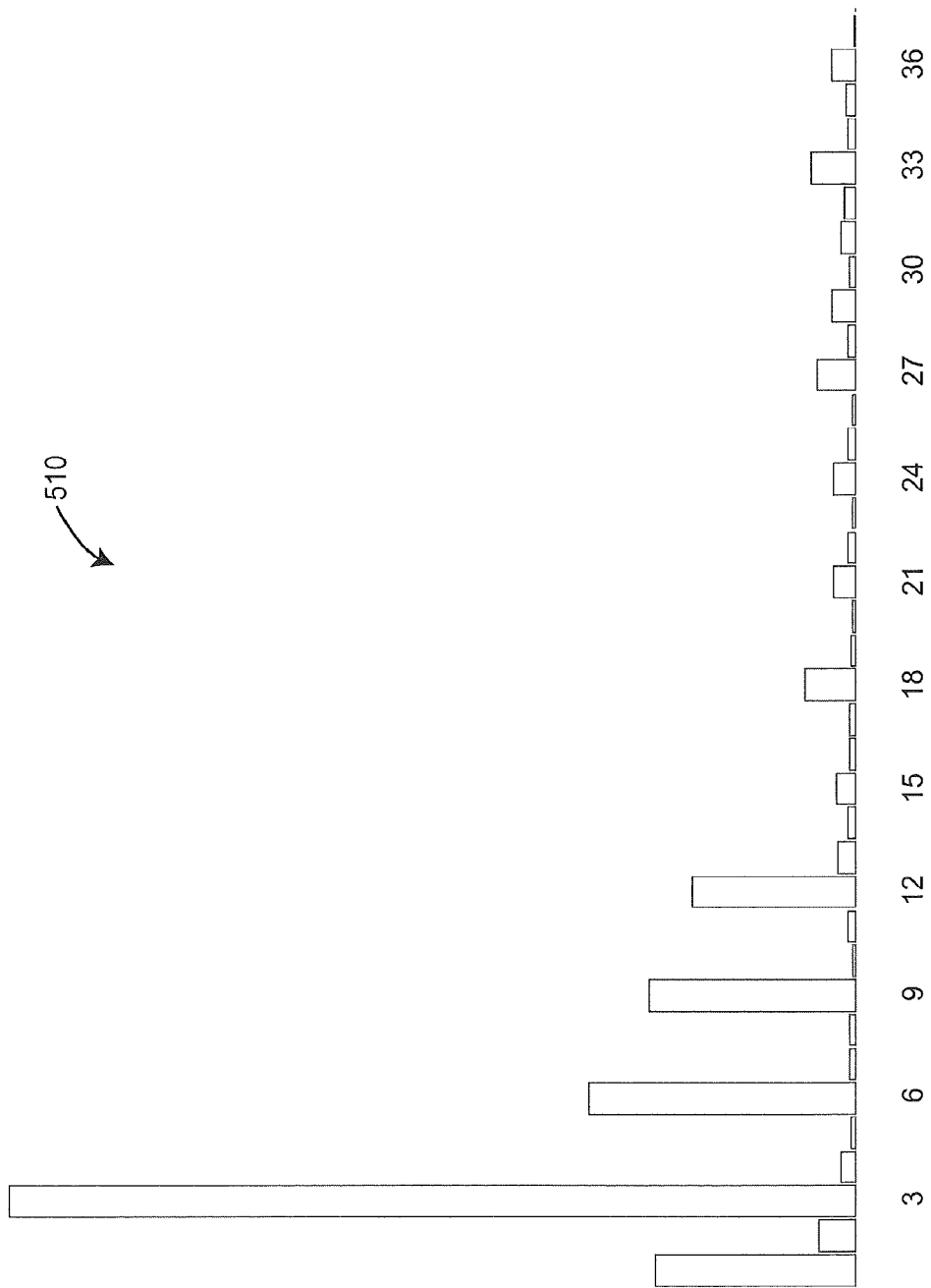
FIG. 5 shows the first 36 Fourier components of the standard encoder map.

As explained in the introduction, angular encoders have a period of 360 degrees, and encoder errors (neglecting 720 degree bearing errors, as described hereinabove) therefore repeat with the same 360 degree period. These errors may be decomposed into spectral (Fourier) components having periods equal to 360°/n, where n=1, 2, 3, . . . . Spectral components 510 of curve 410 (STANDARD MAP) in FIG. 4 are shown in FIG. 5. Note that spectral components n= 3, 6, 9, . . . are the largest components because, for three ideal, symmetrically-spaced read heads, all other components vanish when the values from the three read-heads are averaged together. The other spectral components in FIG. 5 except for n=3, 6, 9, . . . are almost entirely the result of errors in the encoder mapping process. These errors are mainly caused by imperfect mechanical coupling of the reference encoder to the axle and by imperfections in the reference encoder itself.

Figure 6:
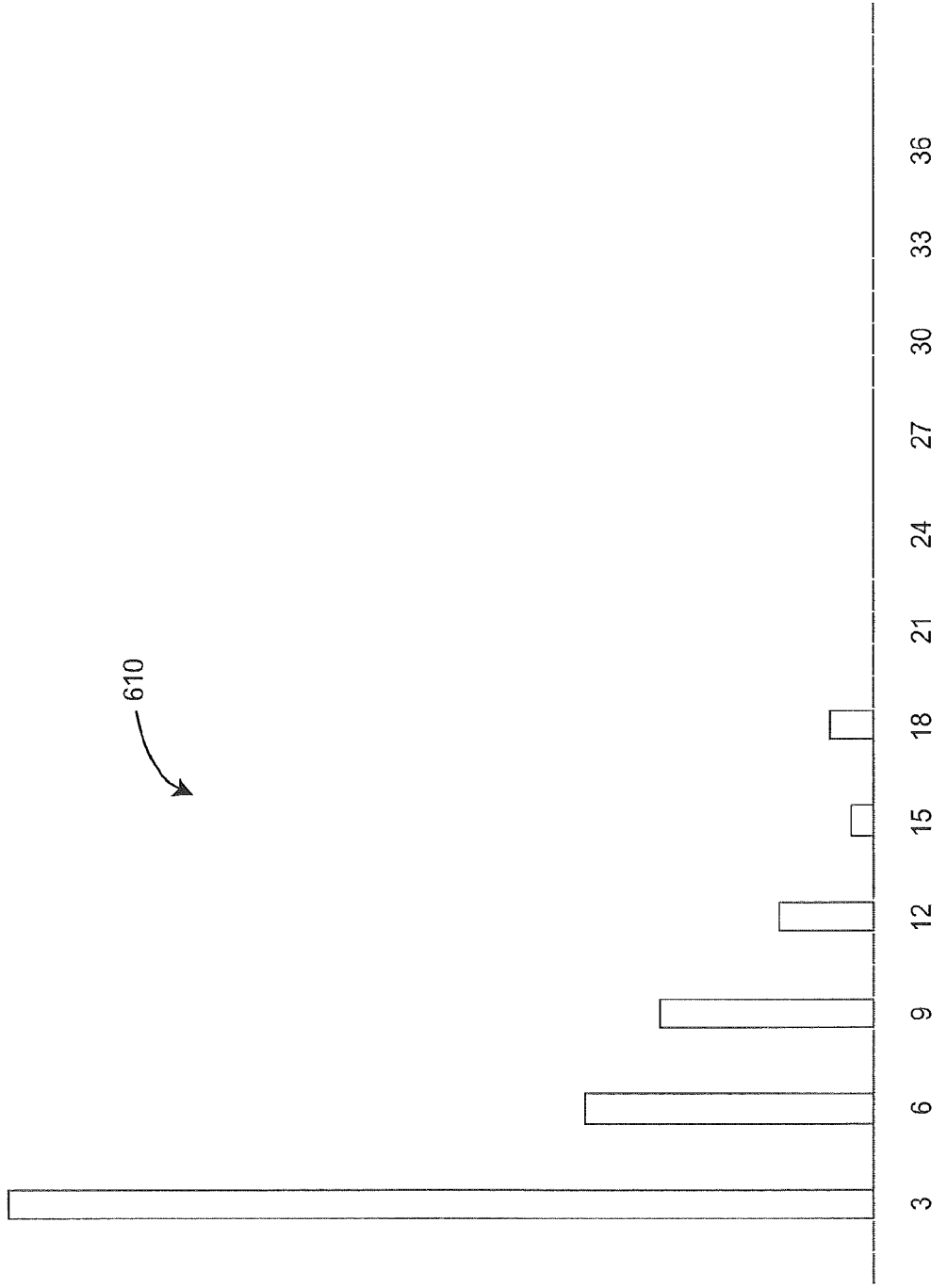
FIG. 6 shows the components of the exemplary result obtained using the inventive method described below.

FIG. 6 shows spectral components 610 for curve 420 (SELF-COMPENSATION RESULT) in FIG. 4. Method 700 for obtaining these spectral components is shown in the flow chart of FIG. 7A. Step 705 is to rotate the patterned element relative to the read heads. Step 710 is to obtain first angular readings for the read-head angles for each of a plurality of first angles. For exemplary encoder 100, readings are taken of measure read heads 120A, 120B, 120C and reference read head 130. For each of i=1, . . . , N first angles $\alpha_i$, the readings of the m measure read heads are $\alpha_k(\alpha_i)$, where k=1, . . . , m represents one of the m measure read heads, and $\alpha_{ref}(\alpha_i)$ is the reading of the reference read head. The value N represents the number of points (steps) measured in the compensation procedure. The number N may be any relatively large number that can be measured relatively quickly and conveniently. For example, N might be 100, or it might be 20,000. To correct for relatively high order spectral modes, it is generally better to use a larger value for N. In an embodiment, an angular step size times the number of steps N is equal to 360 degrees.

One way to obtain the readings in step 710 is to use motors to step the encoder disk relative to the read heads by a desired angular step size over the required number of steps, N. Another way to obtain a number of evenly spaced steps is to rotate the disk continuously, rather than stepwise, with a motor and reading the read-head values at regular intervals. Another possibility is to rotate the encoder disk by hand. In the latter two cases, the data points may not be evenly spaced from 1 to N for a fixed time between readings. It is possible, however, to interpolate the collected data points to get N evenly spaced points. It is also possible to use N points that are not evenly spaced.

In an embodiment, the angles of the reads heads are set to zero when a reference mark passes by a reference position on the structure that holds the read heads. For example, the angle for the reference read head and each of the measure read heads may be set equal to zero when the index mark on the disk or ring passes the reference read head. At this instant, the angle of rotation of the disk or ring is said to be $\alpha=0$, and the angle read by each of the m measure read heads is said to be $\alpha_k(\alpha=0)=0$, where k=1, . . . , m. (For the arrangement shown in FIG. 2 in which there are three measure read heads and one reference read head, m=3.) Thereafter, each angle $\alpha_i$ is defined as the angle of the index mark relative to the reference read head. For an ideal encoder assembly, the values $\alpha_k(\alpha_i)$ for all angles $\alpha_i$ would be equal and would correspond to the angle of rotation $\alpha_i$. In a real encoder assembly, the values $\alpha_k(\alpha_i)$ will be slightly different as a result of errors in the disk or in errors in the mounting of the disk. These differences are used using the method described hereinbelow to find correction factors for the angular readings.

It is possible to use a reference mark different than an index mark. For example, any arbitrary mark or position on the disk or ring could be used as a reference for establishing the zero angle. Furthermore, the reference mark could be set to zero when it satisfies some condition other than passing the reference read head. For example, it could be set to zero when it passed one of the measure read heads or some other device capable of synchronizing the angle of the disk or ring to a signal. Such possible variations will be obvious to one of ordinary skill in the art.

Step 720 is to calculate the differences in the angular readings between each of the m measure read heads and the reference read head. This difference is taken for each read head and for each of the plurality of first angles. The difference values are formed into m arrays—one array for each measure read head:

$$d_k = \{\alpha_k(\alpha_1) - \alpha_{ref}(\alpha_1), \alpha_k(\alpha_2) - \alpha_{ref}(\alpha_2), \alpha_k(\alpha_3) - \alpha_{ref}(\alpha_3), \ldots, \alpha_k(\alpha_N) - \alpha_{ref}(\alpha_N)\} \quad (1)$$

Step 730 is to find first spectral components of the m arrays of Eq. (1). One way to do this is to perform a discrete Fourier transform (DFT) on each of the m arrays, as shown in Eq. (2):

$$F_k = DFT(d_k). \quad (2)$$

Each of the arrays $F_k$ (k=1, ..., m) has N elements but, because the elements $d_k$ are real numbers, the elements in $F_k$ have a two-fold symmetry, enabling the $F_k$ to be unambiguously represented by N/2 values for each k, as is known in the art. Another way to find the spectral components is to perform a best fit of the array of Eq. (1) to a series of sine and cosine terms (or amplitude and phase terms) having the appropriate frequencies with coefficients left as parameters to be found. Such a best fit may be obtained, for example, by minimizing the sum of squared residual errors. This method would be suitable, for example, for finding the coefficients when the collected data points are not evenly spaced. Of course variations of discrete Fourier transforms, such as fast Fourier transforms (FFTs) can also be used. The spectral components $F_k$ resulting from Eq. (2) are called first spectral components to distinguish them from different spectral components obtained hereinbelow.

By spectral components, it will be understood by one of ordinary skill in the art that each spectral component contains two elements. The two elements may include an amplitude and a phase. In this case, the amplitude is a real number and the phase may be an extra term added to the argument of a sine or cosine function. Alternatively, the two elements may be a cosine coefficient and a sine coefficient. In this case, the cosine and sine terms may be written without the addition of a phase term. Another possibility is for the two elements to be real and imaginary parts of a complex number. Other ways of representing spectral components are also possible.

If the first spectral components $F_k$ are written as complex values, they may be converted into cosine and sine coefficients, $C'_k$ and $S'_k$, respectively, by taking real and imaginary parts:

$$C'_k = Re(F_k), \quad (3)$$

$$S'_k = Im(F_k). \quad (4)$$

Since $F_k$ is an array of values, each of $C'_k$, $S'_k$ is also an array of values. In general, it is not necessary to obtain the entire set of N/2 values for $C'_k$ and $S'_k$. Instead, we may select the desired number M of first spectral components. The method for selecting an optimum number of first spectral components M is discussed hereinbelow.

The cosine and sine coefficients of Eqs. (3)-(4) are first spectral components. They represent the spectrum of the difference in readings between the measure and reference read heads. Step 740 is to calculate second spectral components, which represent the spectrum of errors for the overall encoder system as seen by each read head k. The errors of the overall encoder system are partly due to imperfections in the encoder disk and partly due to imperfections in the mounting of the encoder disk (or other patterned structure) in relation to the read heads. In the method described herein, the read heads are assumed to be identical and not to contribute to the error. The limits of validity of this assumption are discussed hereinbelow.

It can be shown that, for identical read heads, the first spectral components are related to second spectral coefficients $S_{kj}$, $C_{kj}$ by $$S_{kj} = [-S'_{kj} + C'_{kj} \cot(j\beta_k/2)]/2, \quad (5)$$

$$C_{kj} = -[C'_{kj} + S'_{kj} \cot(j\beta_k/2)]/2. \quad (6)$$

Here k={1, ..., m} is the read head index and j is the mode index. The function cot is the cotangent and $\beta_k$ is defined as the angular position of measure read head k relative to the reference read head 130. The values of $\beta_k$ for each k={1, ..., m} may be initially selected based on nominal values for the positions of the read heads, obtained for example from mechanical drawings. The integer j, which represents the order of the spectral component, has a value between 1 and M, where M≤N/2 is the desired number of spectral components. The values $\beta_k$ are called the second angles.

The number of spectral components M in Eqs. (3)-(6) is at least one. To understand this, refer to FIG. 6, which shows the result of a self-compensation calculation for the case in which there are three measure read heads and one reference read head, as in FIGS. 2, 3. For reasons explained hereinabove, the errors associated with the modes not equal to 3, 6, 9, . . . are automatically cancelled when the read head readings are averaged. Because of this, it is not necessary to record the coefficients $S_{kj}$, $C_{kj}$ except for j=3, 6, 9, . . . since these are the spectral modes for which calculations involving the coefficients $S_{kj}$, $C_{kj}$ have the possibility of improving encoder accuracy. For the case of FIG. 6, the minimum M might correspond to the value j=3. The same argument can be applied to any number of read heads.

The Eqs. (5) and (6) can be rewritten in a variety of ways to obtain the second spectral components, which are the spectral components for the overall encoder system as seen by read head k. For example, Eqs. (5), (6) could be written to give amplitude and phase values for each spectral component rather than a cosine coefficient and a sine coefficient.

Step 750 is to record the second spectral components. The second spectral components may be stored, for example, in computer memory, or they may be stored on paper or another medium. There are two ways that the second spectral components can be used. They can be used directly in a formula to correct the overall encoder reading based on the present reading of the m read heads. Alternatively, they may be used to construct an error map, whose corrections can be applied by interpolating the read head readings relative to the map. These two ways of using the second spectral components are now discussed.

Consider first the case in which the read heads each read a third angle γ, which is a specific value of the first angle—in other words, a specific angle of rotation of the patterned element relative to the read heads. The error $E_k$ of the $k^{th}$ read head, evaluated at the position of the $p^{th}$ read head, for the third angle $\gamma$ is calculated using the results of Eqs. (5) and (6):

$$E_k(\gamma+\beta_p)=\Sigma_j[S_{kj}\sin(j(\gamma+\beta_p))+C_{kj}\cos(j(\gamma+\beta_p))], \quad k=1,\ldots,m, p=1,\ldots,m. \quad (7)$$

Figure 2:
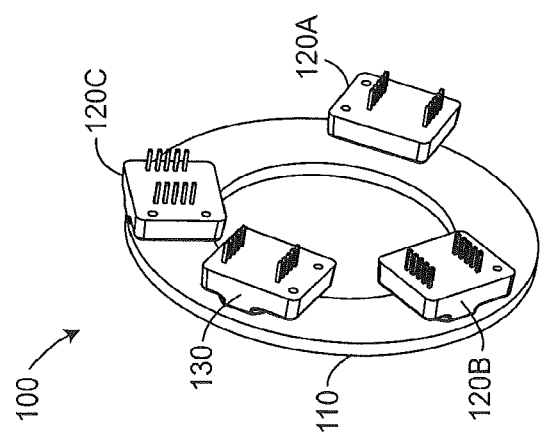
FIG. 2 shows an exemplary encoder disk adjacent to three symmetrically spaced read heads and one asymmetrically spaced read head.
Figure 3:
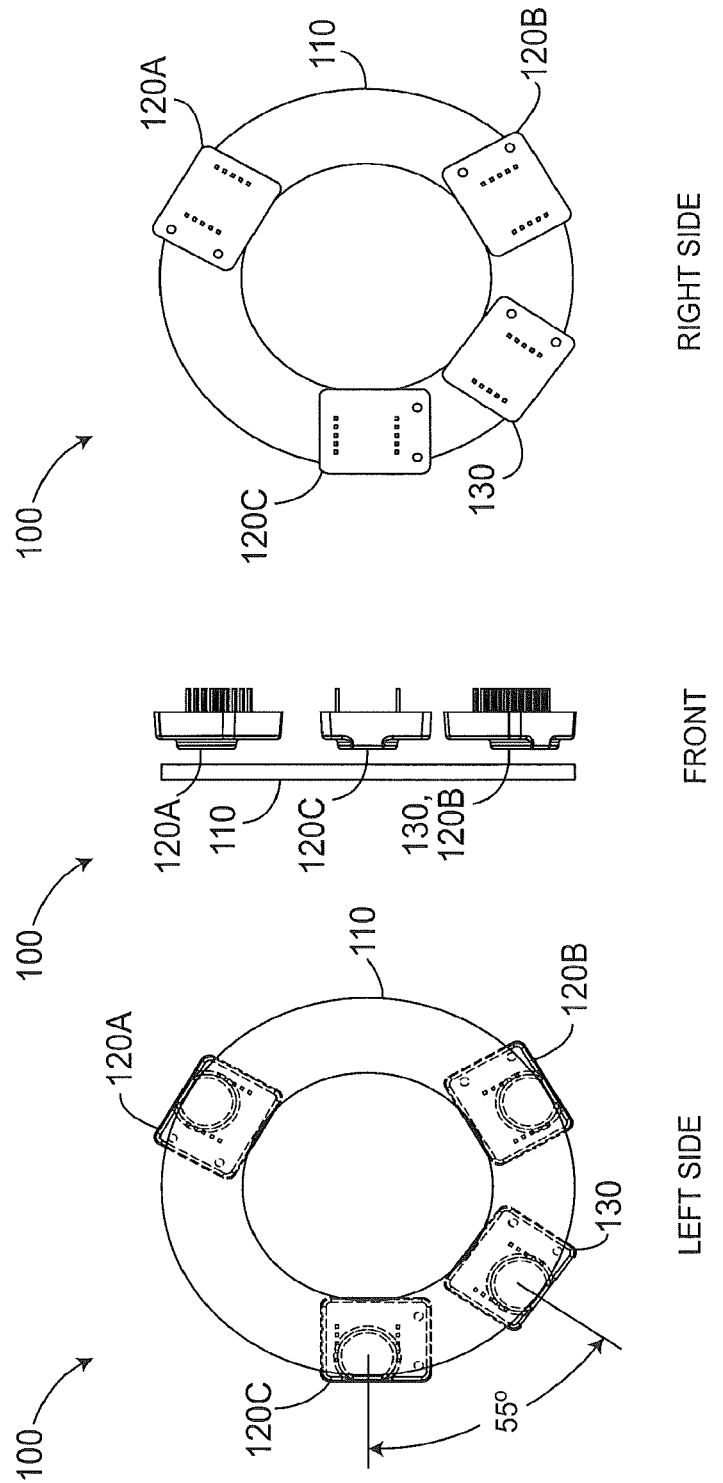
FIGS. 3A-3C shows left side, front side, and right side views of the exemplary encoder disk and read heads.

This error is referred to as the first error. The summation is carried out over the selected j, of which there are M values. The read heads will read slightly different values as a result of read-head errors. For a system having three measure read heads, as shown in FIG. 2, the first errors $E_k$ at this point might appear something like the curves shown in FIG. 9. Note that the errors of the three read heads are approximately aligned because all are measured at the same values $\alpha_i$, which as explained hereinabove are defined as the position of the index pulse relative to the reference read head. This figure is discussed in more detail hereinbelow.

The first errors as seen by the different read heads would ideally be identical but actually differ slightly. Accuracy can be improved by averaging the first errors over the measure read heads:

$$E_{avg}(\gamma+\beta_p)=(1/m)(E_1(\gamma+\beta_p)+E_2(\gamma+\beta_p)+\ldots+E_m(\gamma+\beta_p)), p=1,\ldots,m. \quad (8)$$

Figure 8:
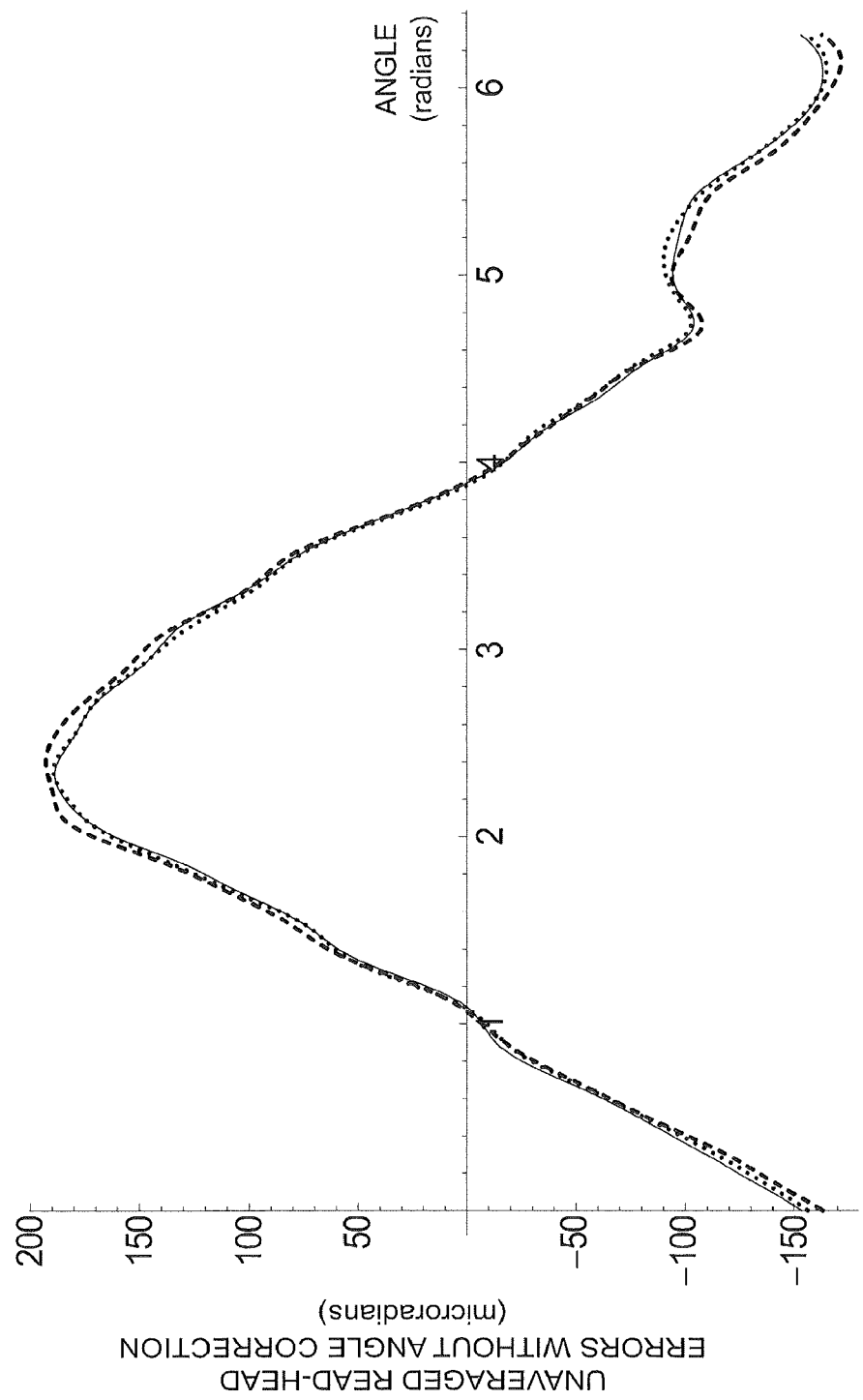
FIG. 8 shows the unaveraged errors in the readings obtained from each of the three read heads.

The quantity $E_{avg}$ is also considered a type of first error. Examples of first average quantities taken over a range of angles are shown in FIG. 8. Here the three different curves differ slightly but all are called first errors. Similarly the average of these three terms is called a first error.

The term averaging as used in this document refers not only to a simple "mean" but to any kind of operation that produces a smoothing action. Such an operation might include, for example, low-pass filtering, rejection of outliers, or other mathematical operations. Although Eq. (8) and other equations below are included in the preferred embodiment described herein, it will be understood by one of ordinary skill in the art that other averaging methods are possible.

The first error, calculated in Eq. (8), is associated with the encoder disk as it is mounted on the structure. In an actual encoder of the sort discussed herein, the measure read heads are symmetrically spaced, which results in significant cancellation of errors, as shown in the following equation:

$$\epsilon_{avg}(\gamma)=(1/m)(E_{avg}(\gamma+\beta_1)+E_{avg}(\gamma+\beta_2)+\ldots+E_{avg}(\gamma+\beta_m)). \quad (9)$$

This error is called the second error.

The correction value of Eq. (12) was obtained by putting spectral components into Eq. (7). An alternative approach is to calculate correction factors for a variety of angles and then to put these into a table (map) that can be used with an interpolation method to obtain the correction for a particular measured angle. In this case, the first error Eq. (7) would be written in terms of a collection of first angles:

$$E_k(\delta_i+\beta_p)=\Sigma_j[S_{kj}\sin(j(\delta_i+\beta_p))+C_{kj}\cos(j(\delta_i+\beta_p))], \quad k=1,\ldots,m, p=1,\ldots,m. \quad (10)$$

The first errors as seen by the different read heads would ideally be identical but actually differ slightly. Accuracy can be improved by averaging the first errors:

$$E_{avg}(\delta_i+\beta_p)=(1/m)(E_1(\delta_i+\beta_p)+E_2(\delta_i+\beta_p)+\ldots+E_m(\delta_i+\beta_p)), i=1,2,\ldots,N. \quad (11)$$

For this case, the second error of Eq. (12) is revised as $$\epsilon_{avg}(\delta_i)=(1/m)(E_{avg}(\alpha_i+\beta_1)+E_{avg}(\delta_i+\beta_2)+\ldots+E_{avg}(\delta_i+\beta_m)). \quad (12)$$

The error values $\epsilon_{avg}(\delta_i)$ may be put into a table as a function of $\delta_i$. Here $\delta_i$ may represent any angle whatsoever and is not necessarily restricted to the first angles; that is, those angles measured to find the arrays of difference values.

The second angles $\beta_k$ may estimated based on mechanical drawings. They may be found more accurately by performing an optimization procedure. To do this, the residual errors are calculated:

$$R_{ki}=E_k(\alpha_i)-E_{avg}(\alpha_i). \quad (13)$$

Residual errors are used to compute the merit function Q of Eq. (9), $$Q(\beta_1,\beta_2,\beta_3)=\Sigma_{i=1\ldots N}\Sigma_k R_{ki}^2, \quad (14)$$

and then to minimize the merit function in an optimization routine to find the best-fit angles $\beta_1, \beta_2, \ldots, \beta_m$.

Figure 10:
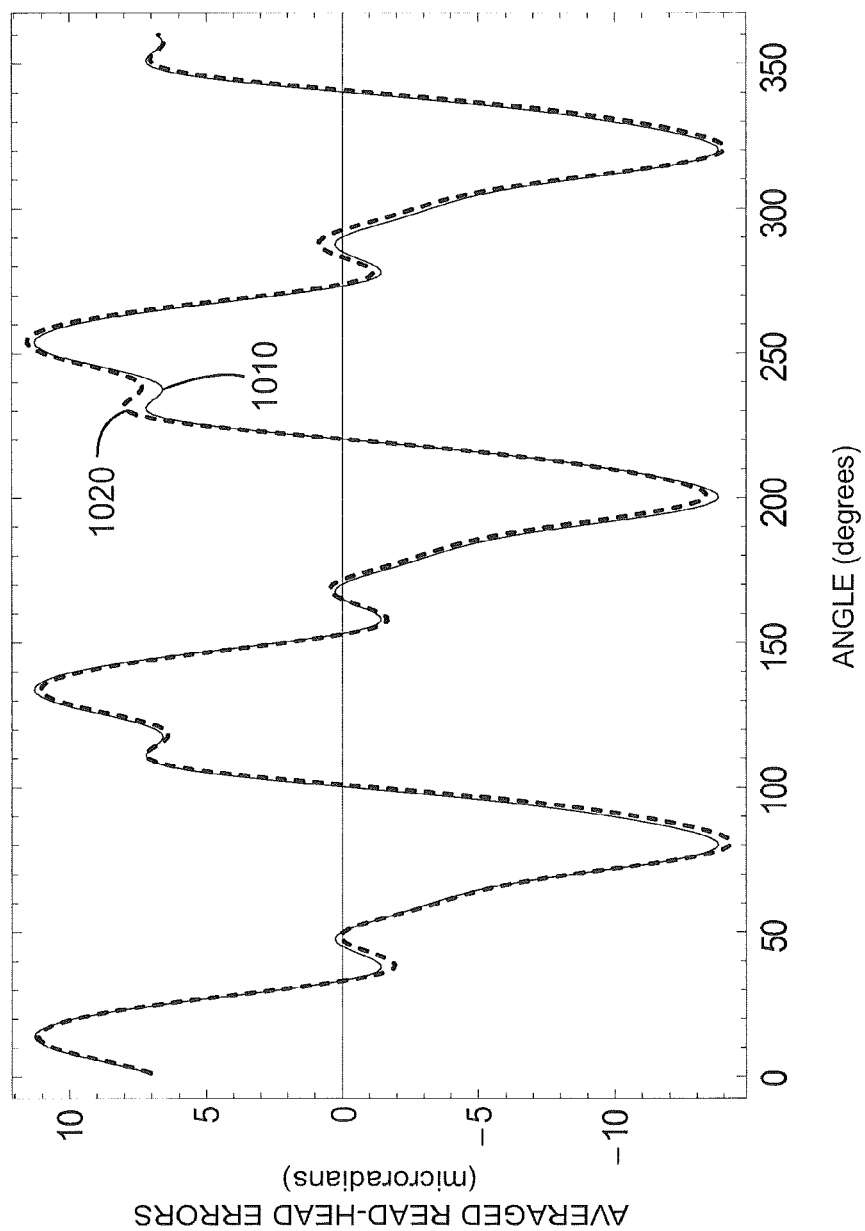
FIG. 10 shows the averaged read-head compensation values before and after the best-fit procedure has been performed.

For a system having three measure read heads, as shown in FIG. 2, the errors $\epsilon_{avg}$ at this point might appear something like the curves shown in FIG. 10. The number of points will in general not be large enough to provide the resolution possible with the encoder. Compensation (mapping) values are applied for angles between adjacent values of $\alpha_i$ by using interpolation. A variety of types of interpolation may be used: linear, polynomial, spline, and so forth.

Figure 7:
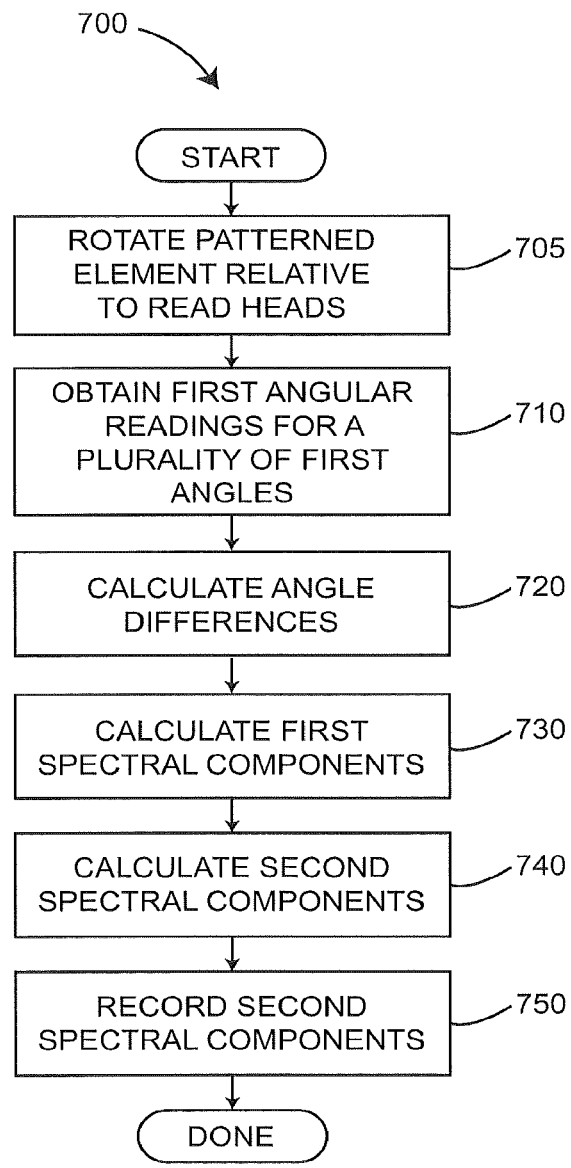
FIG. 7 is a flow chart showing the steps taken to obtain the self-compensation result.
Figure 9:
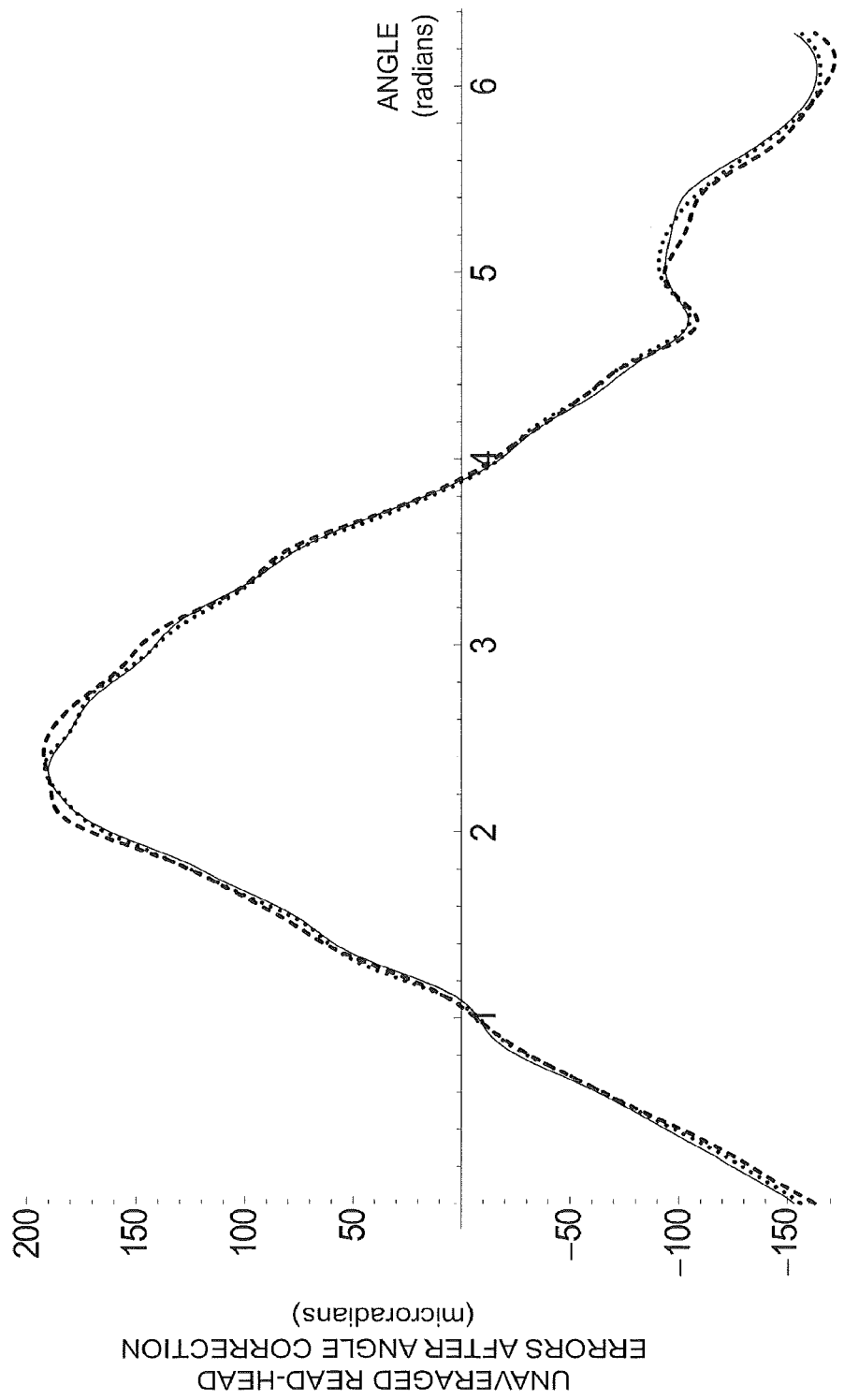
FIG. 9 shows the unaveraged errors in the readings obtained from each of the three read heads after the positions of the read heads have been adjusted using a best-fit procedure.

The basic assumption behind the mathematical method described here and depicted in the flow chart of FIG. 7 is that all the read heads are similar and will read the same values when placed at the same position relative to the rotating disk or ring. FIG. 8 shows the unaveraged errors in the readings obtained from each of the three read heads. The readings of two of the three read heads have been shifted by 120 degrees to align each of the curves. If these three curves were left in their original positions, they would average to a very small residual error. In the example shown the unaveraged errors vary from about −150 microradians to 200 microradians. The curves of FIG. 8 are for the case that the measure read heads are evenly spaced. In this example, there are three read heads spaced 120 degrees apart. FIG. 9 shows the unaveraged errors in the readings obtained from each of the three read heads after the angular positions of the read heads have been adjusted using the best-fit procedure of step 770 of FIG. 7.

Figure 11:
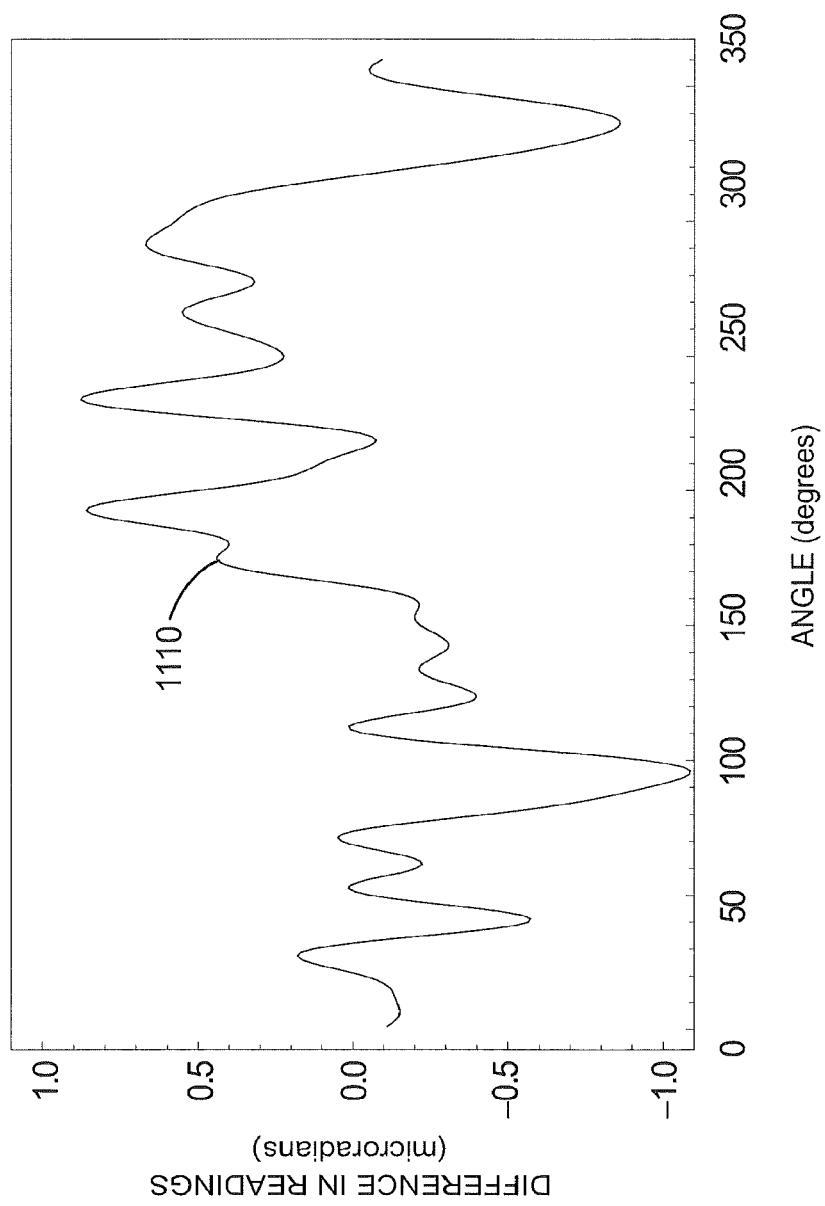
FIG. 11 shows the difference in readings with and without the best fit procedure.

FIG. 10 shows the errors that remain after the three read heads have been averaged together. Curve 1010 shows the error that remains for the case in which the read heads are assumed to be exactly 120 degree apart. Curve 1020 shows the error that remains for the case in which the spacing between the three read heads is adjusted according to the computed best-fit angles. The difference between these two curves 1110 is shown in FIG. 11. In this example, the maximum difference is about 1 microradian. Although this difference is small, it is significant for a very high accuracy encoder.

The mathematical treatment represented by the flow chart in FIG. 7 is based on the assumption that the reference read head will read the same values as each of the measure read heads when the encoder disk is moved into an equivalent position. If this assumption were completely valid, the three curves of FIG. 9 would exactly overlap. Clearly this is not the case, but the error is small. Two of the three curves match very well, and the third curve is a little different. The maximum deviation in the readings between any two curves is about 9 microradians. Since the three curves are averaged together, the resulting maximum error is about 3 microradians. The average error over all angles is about 1 microradian.

By observing the differences in the readings of the three measure read heads relative to the reference read head, it is possible to detect problems in particular read heads or in the placement of the read heads on mounting plate 62. If these differences are detected at the factory, the read heads may be checked for alignment, or one of the read heads may be replaced. If these differences are detected in field operation, it may indicate that one of the read heads has moved and may suggest that the encoder assembly needs to be recompensated or repaired.

The encoder assembly described above contains one asymmetrically placed reference read head and a plurality of symmetrically placed measure read heads. One might ask why it is necessary for the reference read head to be placed asymmetrically. Why is it not possible to simply compare the symmetrically placed read heads to one another? The answer can be seen in Eqs. 5 and 6. Each equation contains the term $\cot(j\beta_k/2)$, where $\beta_k$ is the angle of the measure encoder relative to the reference encoder and j is an integer between 1 and N, where N is the number of comparison angles. If there are m symmetrically placed read heads, then the angular spacing between read heads is $2\pi/m$ radians, and the spacing between any two read heads is $2\pi q/m$ radians, where q is another integer. If we use one of symmetrically placed read heads as the reference read head, then $h_k = 2\pi q/m$, and the argument of the cotangent function is $j\pi q/m$. The cotangent function goes to plus or minus infinity whenever its argument goes to $\pi p/2$, where p is an odd integer. This happens whenever $j\pi q/m = \pi p/2$, which is when $j = 0.5\, m\, p/q$. For symmetrically spaced read heads, there will in general be many values of j for which the cotangent argument goes to infinity.

Figure 12:
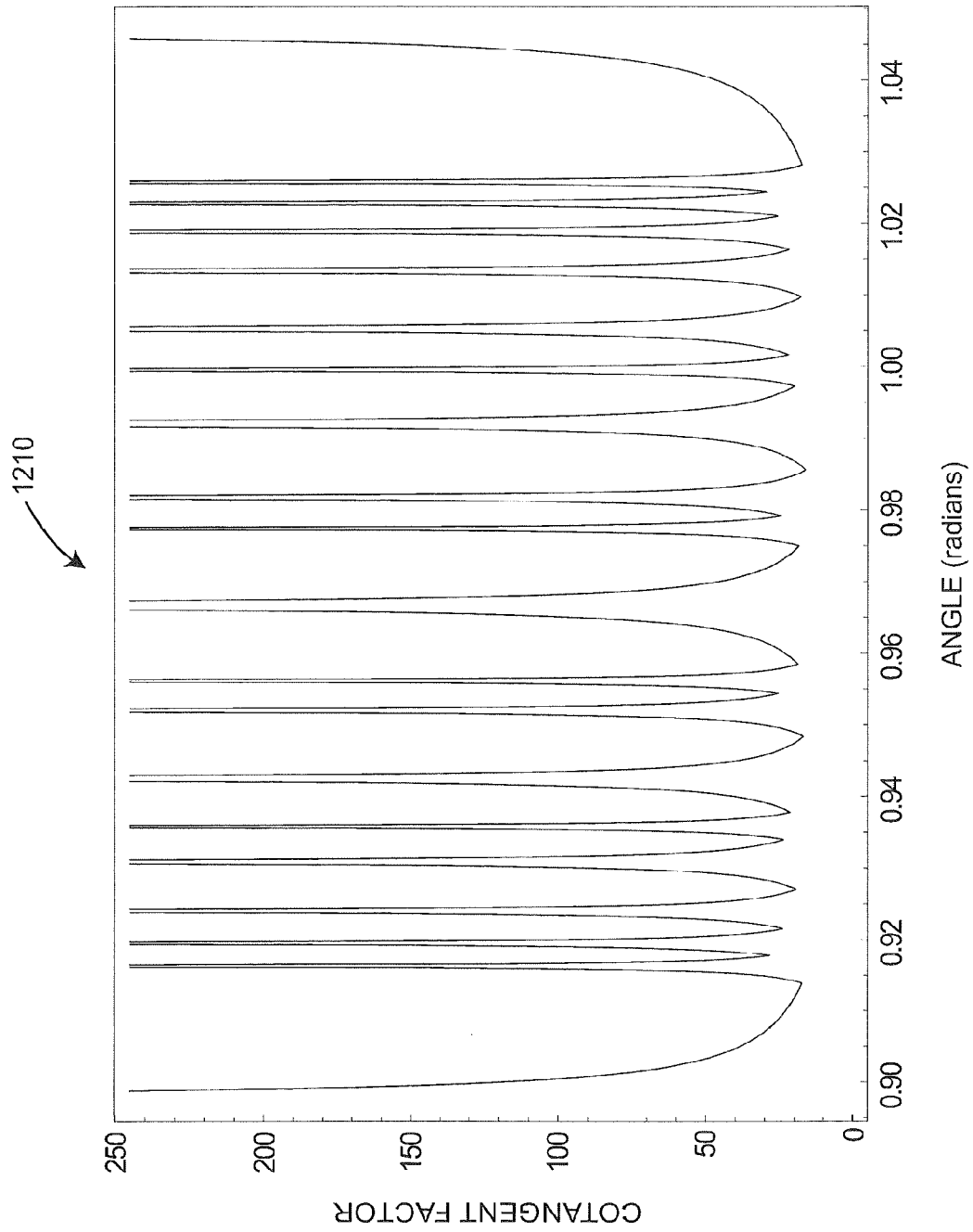
FIG. 12 is an exemplary plot of the maximum cotangent values versus the angle between reference and measure read heads.

By carefully selecting the position of an asymmetrically placed reference read head, this problem can be avoided. FIG. 12 is a graph that shows on the horizontal axis values of $\beta_k$ between 0.90 and 1.05 radians. In this case, it is assumed that the encoder is compensated for spectral modes $j=1, \ldots, 50$. For each angle $h_k$, we find $\cot(j\,\beta_k/2)$ for all values of j. The vertical axis of FIG. 12 represents the maximum cotangent value for each of the 50 spectral modes. From this graph, it is clear that there are some regions for which the cotangent factor is approximately 20. To avoid amplifying error, we will want to choose each angle $h_k$ to make the maximum cotangent values as small as possible. We can also reduce the size of the maximum cotangent values by choosing a smaller number of spectral modes—for example, by choosing $j=1, \ldots, 20$ rather than $j=1, \ldots, 50$. In most cases, the lower order modes have the largest values and are the most important.

A summary is now given for the embodiment described hereinabove. With a traditional mapping method, an external encoder is placed on a shaft and the readings of that encoder are compared to an encoder under test, also located on the shaft. This mapping method can improve the accuracy of an encoder but may introduce errors, as is apparent in FIG. 5. In this figure, an encoder having three read heads whose readings are averaged together should have only errors remaining for $n=3, 6, 9, \ldots$. However, it is clear form FIG. 5 that there are significant errors at orders 1 and 2. The inventive compensation method taught hereinabove does not require a reference encoder to obtain a map but instead uses a self-compensation procedure in which the error values are calculated based on numerous encoder readings that provide a means of finding compensation parameters by taking Fourier transforms or extracting the spectral components using an alternative mathematical method. The resulting errors are strictly at the expected orders of $n=3, 6, 9, \ldots$, and thereby avoids the errors inherent in using an external reference encoder. Furthermore, as explained hereinabove, this procedure may be carried out in the work environment, thereby enabling correction for thermal effects or for shocks that may have realigned the encoders slightly. These procedure carried out in the work environment can be performed without any special fixturing and without removing any covers from the instrument.

Figure 13:
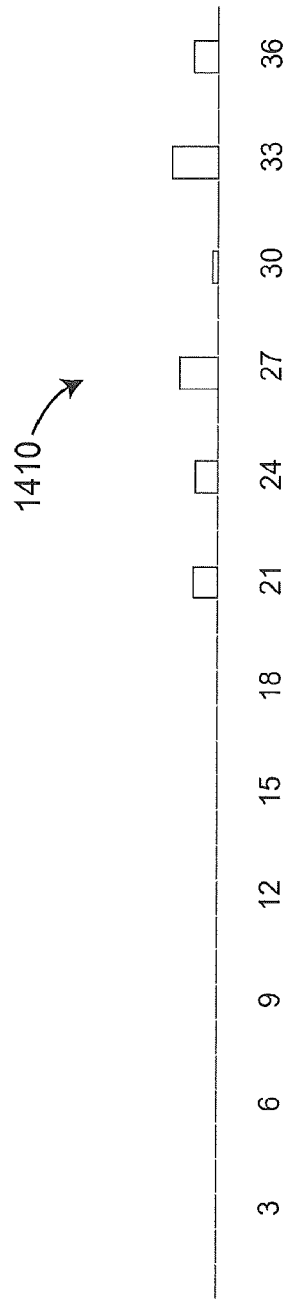
FIG. 13 shows the spectral components extracted from data obtained by mapping to an external reference encoder.
Figure 14:
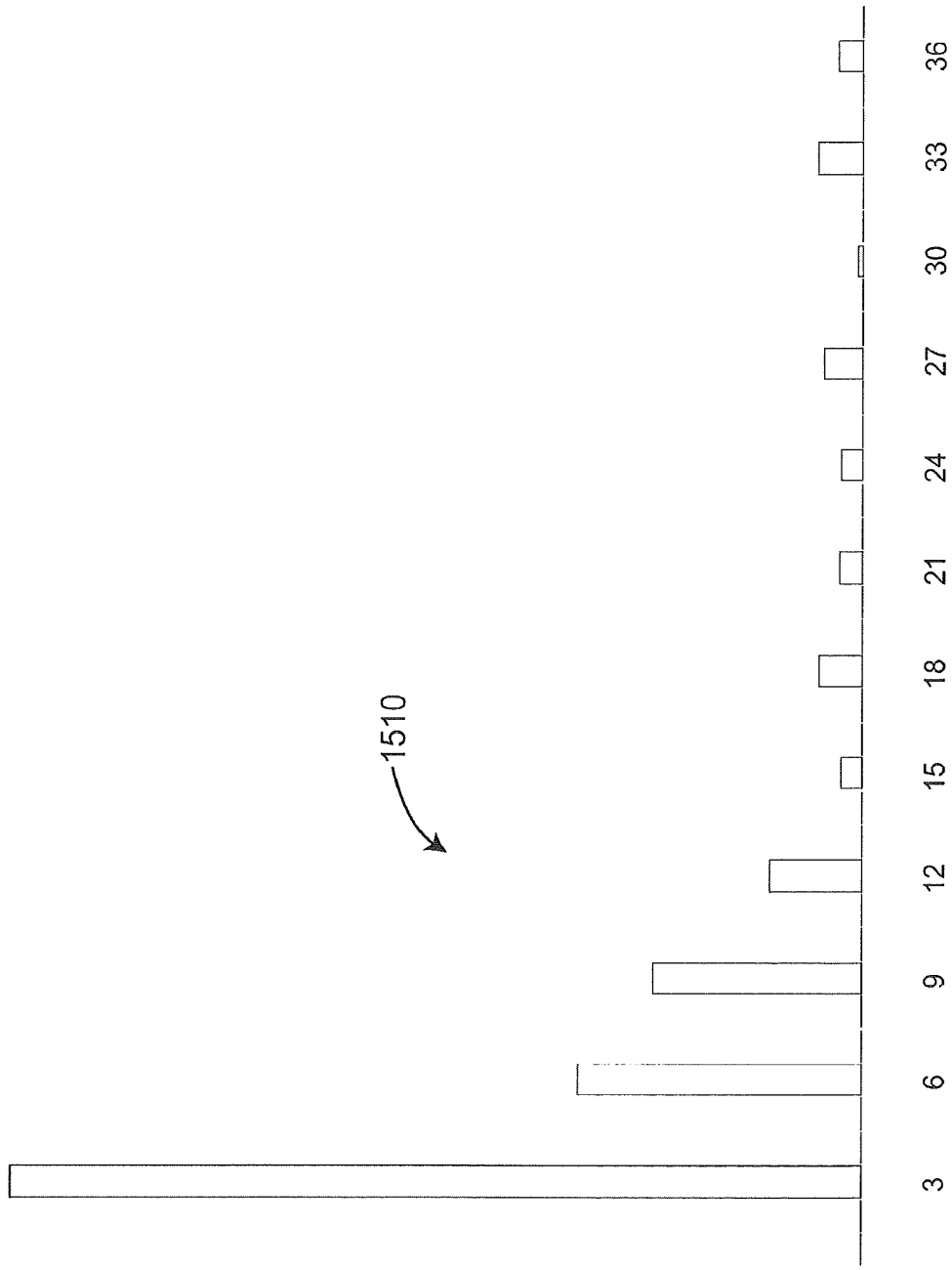
FIG. 14 shows spectral components obtained by combining the self-compensation result with the additional components from mapping to an external reference encoder.
Figure 15:
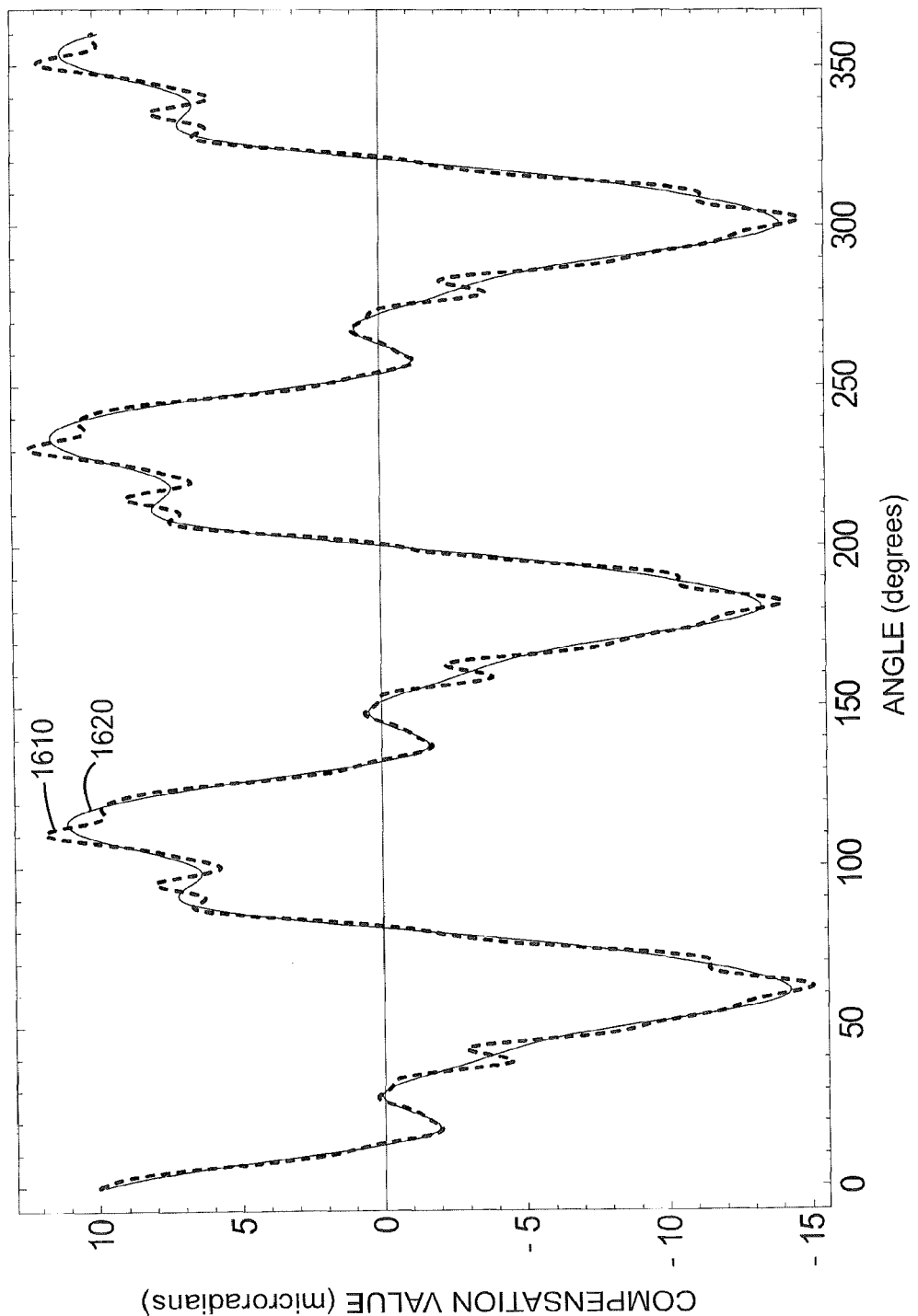
FIG. 15 shows second exemplary result obtained using the self-compensation procedure and third exemplary result obtained using self-compensation procedure supplemented by some modes extracted from map to external reference encoder.

In another embodiment, the method described hereinabove is supplemented by values obtained using an external reference encoder—that is, a reference encoder attached to the end of a shaft that also holds the encoder under test. In some cases, this may be desirable because there is some maximum number of spectral components that can be obtained using the mathematical method of FIG. 7. As shown for the example considered here in FIG. 6, six spectral components are extracted: 3, 6, 9, 12, 15, and 18. To a very good approximation, all spectral components that are not multiples of three are eliminated by averaging the readings of the three symmetrically placed read heads. However, in some cases, there may be some additional spectral components whose order is too large to reliably extract using the mathematical method of FIG. 7 but that may be extracted from a map made using external reference encoder. FIG. 5 shows spectral components 510 from map 410 obtained using an external reference encoder. Since modes other than multiples of three should almost entirely cancel out, it is clear that there was some noise in the external mapping procedure. In this example, for spectral components of order 20 and below, more accurate spectral components, obtained from the mathematical procedure of FIG. 7, are shown in FIG. 6. For spectral components of order larger than 20, it is possible to extract from FIG. 5 those components 1410 that are multiples of three, as shown in FIG. 13. These spectral components 1410 of FIG. 13 are combined with the spectral components 610 of FIG. 6 to obtain components 1510 of FIG. 14. These spectral components can be transformed through an inverse Fourier transform or equivalent method into the result of FIG. 15. The combined compensation result 1610 is similar to the self-compensation curve 1620 except that it contains a small amount of higher frequency ripple. In this example, the ripple has a maximum magnitude of about one microradian.

In deciding how many spectral components to include from the external map, it is a good idea to look at the amount of noise in the external map. An idea of the amount of noise can be obtained by looking at the size of the spectral components that are multiples of three compared to the other components, which should be nearly zero. In this case, noise is reasonable to order 36, but it may not be a good idea to extend the spectral components form the external map much higher than this for the particular example considered here.

In evaluating the procedure described above, it is worthwhile to evaluate the potential errors. Errors may be caused by the following: (1) the read heads do not read exactly the same values for equivalent positions of the encoder disk; (2) the mathematical method cannot extract more than a certain number of spectral components because the cotangent factor gets too large; (3) there is a slight error in the calculated angular positions of the read heads. In addition, if additional components are extracted from an external map to supplement the spectral components from the self-compensation procedure, there will be noise associated with these.

For the errors of types (1) and (2) above, we can see from FIG. 9 that, for the three read head readings averaged together, the typical error is about 1 microradian and the maximum error is about 3 microradians. This of course refers to the exemplary case considered here. In addition, the error of type (2) must account for spectral orders above those extracted mathematically. Comparing the results of the two curves of FIG. 15, we can see that the maximum difference is about 1 microradian and that the typical difference is a fraction of a microradian. For the error of type (3), we expect the error to be a small fraction of the maximum size of the correction of about 1 microradian. Combining all three errors, we expect for the exemplary case considered here that the overall error will have a typical value of about 2 microradians and a maximum value of about 4 microradians. In some cases, it may be possible to reduce this error by adding some components from an external encoder map, as explained above.

In summary, the methods described hereinabove involves a placement of read heads that enable a mathematical procedure to more accurately compensate encoder errors than would be possible using traditional encoder mapping methods. In most cases, the procedure is carried out without the need of the external mapping procedure, thereby saving time and money. In addition, because the mapping procedure can be carried out in the field, it can be applied quickly (in less than a minute) whenever it is needed.

The self compensation procedure is a great advantage in overcoming increased errors that occur with changes in environmental conditions and especially temperature. Changes in temperature are known to produce changes in the encoder map. The encoder self-compensation procedure can be run in less than a minute. Consequently, it can be performed whenever temperature has changed significantly, thereby providing a high accuracy result at all temperatures.

The encoder design and compensation procedure also have advantages for detecting problems in manufacturing or in the field. For example, if the read heads are not seated properly or if one of the read heads is defective, that will show up in a comparison of the readings of the three read heads, as in FIG. 9. If the encoder self-compensation result changes significantly after a field check, it may indicate that there is a problem with the encoder. For example, it may indicate that the glue holding the read head to the flange has come loose.

Figure 16:
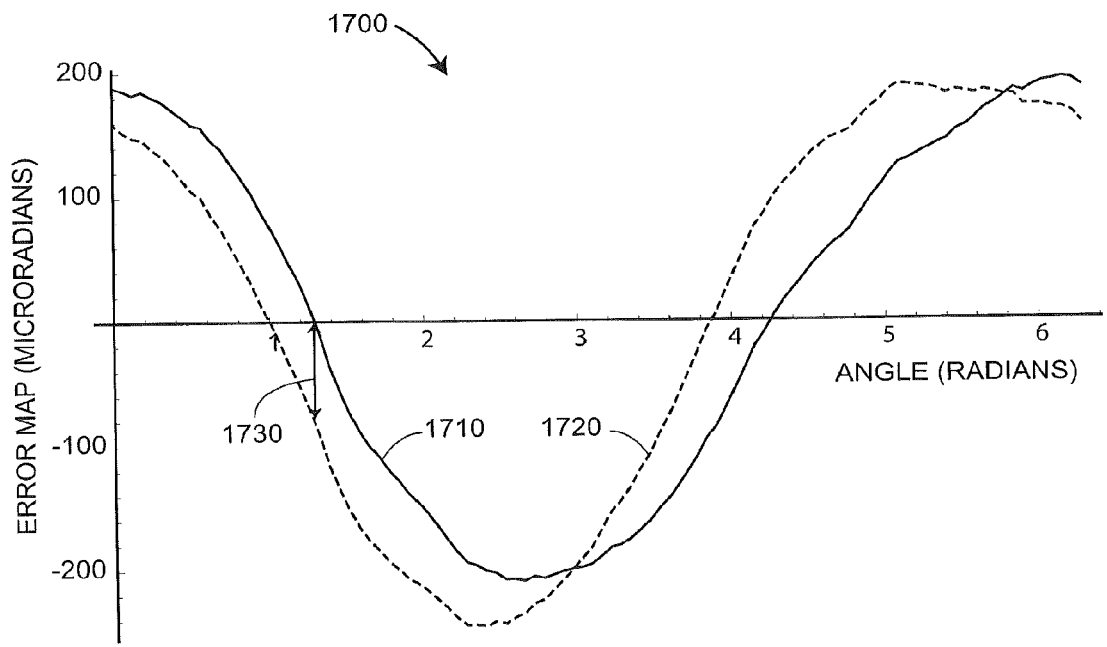
FIG. 16 shows a graph of an encoder map for temperatures of 10 and 30 degrees Celsius.
Figure 17:
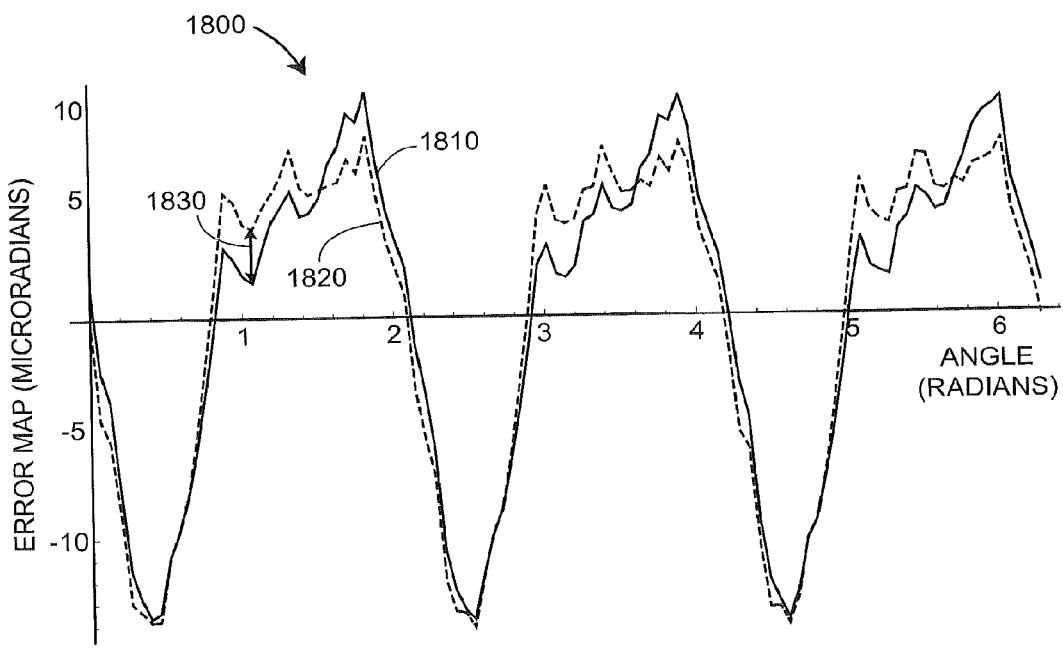
FIG. 17 shows a graph of an encoder map for temperatures of 10 and 30 degrees Celsius.

As mentioned hereinabove, an important consideration in at least two or three symmetrically spaced read heads, in addition to an asymmetrical reference read head, is illustrated in FIGS. 16, 17. FIG. 16 shows the error map for a single read head at 10 degrees Celsius (curve 1710) and at 30 degrees Celsius (curve 1720). The shift in these two curves is 80 micrometers, as indicated by vertical line 1730. In contrast, FIG. 17 shows the effect of using three symmetrical read heads. FIG. 17 shows the error map for a single read head at 10 degrees Celsius (curve 1810) and at 30 degrees Celsius (curve 1820). The maximum difference in these two maps is about 2 microradians. Since it may be difficult to consistently compensate every time temperature changes, the use of at least two or three symmetrical read heads in addition to an asymmetrical read head is highly desirable.

The apparatus and method described herein may be advantageously used with a variety of devices. In the metrology field, an angular encoder having the properties described may be usefully employed in laser trackers, laser scanners, total stations, articulated arms, rotary stages, indexing tables, and other devices that make require high accuracy angular measurements. In the manufacturing field, an angular encoder having the properties described may be usefully employed in lathes, milling machines, robot mechanisms, and indexing heads. In the scientific and defense fields, an angular encoder having the properties described hereinabove may be usefully employed in telescope pointing systems, gimbal pointing structures, and the like. There are many other applications to which this technology may be usefully directed.

In the discussion above, examples have been given in which a Fourier transform (for example, a discrete Fourier transform) is used to extract spectral components. It should be understood, however, that other methods (for example, best fit methods) may be used to find spectral components. In general, the term Fourier component should be interpreted to mean a spectral component obtained by whatever means.

While preferred embodiments have been shown and described, various modifications and substitutions may be made thereto without departing from the spirit and scope of the invention. Accordingly, it is to be understood that the present invention has been described by way of illustrations and not limitation.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for self-compensating an angular encoder system with steps comprising:

providing the angular encoder system that includes an angular encoder and a processor, the angular encoder including a structure, a patterned element, and read heads, the patterned element configured to rotate by a first angle relative to the structure, the rotation performed about an axis, the read heads including one reference read head and a number m of measure read heads, the number m being greater than or equal to two, the read heads fixedly disposed on the structure and located on a plane and positioned about a central point at an intersection of the axis and the plane, each read head in optical communication with the patterned element, each read head disposed on the structure at a first radius and a second angle about the central point, the measure read heads arranged in such a way that separation between the second angles of adjacent measure read heads is equal to 360 degrees divided by the number m, the reference read head arranged between two adjacent measure read heads, the processor electrically connected to the read heads;

selecting a desired integer M of first spectral components for which the angular encoder is to be self-compensated for modes j=1, 2, 3 . . . M;

determining a cotangent factor for a collection of angles $h_k$ for each of the measure read heads k=1, 2, . . . , m, the cotangent factor being a maximum of values $\cot(jh_k/2)$ evaluated at the collection of angles $h_k$ over the modes j=1, 2, 3 . . . M;

selecting for each of the measure read heads k=1, 2, . . . , m an angle $\beta_k=h_k$ for which the cotangent factor is a minimum;

placing the reference read head at a position to obtain the angles $\beta_k$ relative to the measure read heads;

rotating the patterned element relative to the read heads by N first angles covering a range of at least 360 degrees, wherein M≤N/2;

obtaining, at each of the N first angles, first angular readings for the m measure read heads and for the reference read head;

calculating a first array $d_k$ for each of the measure read heads k, each first array $d_k$ including, for each of the N first angles, a difference in the first angular readings of the measure read head and the first angular reading of the reference read head;

calculating, for each measure read head k, at least one first spectral component $F_k$ based at least in part on the first array $d_k$;

storing the m first spectral component $F_k$;

determining by the processor an angle $\phi$ of rotation of the patterned element relative to the structure based at least in part on a summation of values that depend on measurements of the m measure read heads at the angle $\phi$ and on the stored m first spectral components $F_k$; and storing the determined angle $\phi$.

2. A method for self-compensating an angular encoder system with steps comprising:

providing the angular encoder system that includes an angular encoder, a motor, and a processor, the angular encoder including a structure, a patterned element, and read heads, the patterned element configured to rotate by an element angle relative to the structure, the rotation performed about an axis, the read heads including one reference read head and a number m of measure read heads, the number m being greater than or equal to two, the read heads fixedly disposed on the structure and located on a plane and positioned about a central point at an intersection of the axis and the plane, each read head in optical communication with the patterned element, each read head disposed on the structure at a first radius and a read-head angle about the central point, the measure read heads arranged in such a way that separation between the read-head angles of adjacent measure read heads is equal to 360 degrees divided by the number m, the reference read head arranged between two adjacent measure read heads, the motor configured to step the patterned element relative to the read heads by a desired angular step size, the processor electrically connected to the read heads;

in a first instance, performing a first encoder self-compensation procedure:

determining a first temperature;

rotating with the motor the patterned element relative to the read heads by N first compensation angles covering a range of at least 360 degrees;

obtaining, at each of the N first compensation angles, first angle self-compensation readings for the m measure read heads and for the reference read head;

determining by the processor first compensation parameters, based at least in part on the obtained first angle self-compensation readings and the first temperature;

in a second instance, making a second angle measurement:

obtaining second angle readings for the m measure read heads;

determining with the processor a second angle of rotation of the patterned element relative to the structure, the determined second angle of rotation based at least in part on the first compensation parameters and on the second angle readings;

in a third instance performing a second encoder self-compensation procedure:

determining a second temperature;

rotating with the motor the patterned element relative to the read heads by M second compensation angles covering a range of at least 360 degrees;

obtaining, at each of the M second compensation angles, third angle self-compensation readings for the m measure read heads and for the reference read head;

determining by the processor second compensation parameters, based at least in part on the obtained third angle self-compensation readings and the second temperature;

in a fourth instance, making a fourth angle measurement:

obtaining fourth angle readings for the m measure read heads;

determining with the processor a fourth angle of rotation of the patterned element relative to the structure, the determined fourth angle of rotation based at least in part on the second compensation parameters and on the fourth angle readings; and storing the fourth angle of rotation.

3. The method of claim 2, further comprising:

determining a difference between the first compensation parameters and the second compensation parameters; and determining a problem with the encoder, based at least in part on the determined difference between the first compensation parameters and the second compensation parameters.

4. The method of claim 3, further comprising:

determining a difference between the first temperature and the second temperature; and the step of determining a problem with the encoder is further based on the determined difference between the first temperature and the second temperature.

* * * * *